=""

US008380480B2

(12) United States Patent
Homma

(10) Patent No.: US 8,380,480 B2
(45) Date of Patent: Feb. 19, 2013

(54) COMPUTER PRODUCT, ANALYSIS SUPPORT APPARATUS, AND ANALYSIS SUPPORT METHOD

(75) Inventor: Katsumi Homma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 12/913,425

(22) Filed: Oct. 27, 2010

(65) Prior Publication Data

US 2011/0125480 A1 May 26, 2011

(30) Foreign Application Priority Data

Nov. 25, 2009 (JP) ................................ 2009-268121

(51) Int. Cl.
*G06F 17/50* (2006.01)
(52) U.S. Cl. ........................................... 703/14; 703/13
(58) Field of Classification Search .................... 703/13, 703/14
See application file for complete search history.

(56) References Cited

U.S. PATENT DOCUMENTS

| 7,441,211 | B1* | 10/2008 | Gupta et al. | 716/133 |
| 7,650,580 | B2* | 1/2010 | Kucukcakar et al. | 716/100 |
| 7,917,451 | B2* | 3/2011 | Barnett et al. | 705/400 |
| 2008/0005707 | A1* | 1/2008 | Papanikolaou et al. | 716/4 |
| 2009/0031268 | A1* | 1/2009 | Miranda et al. | 716/6 |

OTHER PUBLICATIONS

Mani et al., "A Statistical Algorithm for Power- and Timing-Limited Parametric Yield Optimization of Large Integrated Circuits", IEEE Transactions on Computer-Aided Design of Integrated Circuits and Systems, vol. 26, No. 10, Oct. 2007, pp. 1790-1802.*
Srivastava et al., "A Novel Approach to Perform Gate-Level Yield Analysis and Optimization Considering Correlated Variations in Power and Performance", IEEE Transactions on Computer-Aided Design of Integrated Circuits and Systems, vol. 27, No. 2, Feb. 2008, pp. 272-285.*
Srivastava, Ashish et al., "Accurate and Efficient Gate-Level Parametric Yield Estimation Considering Correlated Variations in Leakage Power and Performance", pp. 535-540, Jun. 2005.

\* cited by examiner

*Primary Examiner* — Omar Fernandez Rivas
*Assistant Examiner* — Herng-Der Day
(74) *Attorney, Agent, or Firm* — Fujitsu Patent Center

(57) ABSTRACT

A non-transitory, computer-readable recording medium stores therein a program causing a computer to execute calculating, using respective standard deviations of first delay distributions of delay variation independent to each element included in a path among parallel paths in a circuit, standard deviation of a first delay distribution of the path when modeled as a series circuit; correcting the standard deviation of the first delay distribution for each element, using the calculated standard deviation of the first delay distribution of the path and a standard deviation of a first delay distribution of the path obtained by a statistical delay analysis on the circuit; obtaining a correlation distribution representing a correlation between delay and leak current of the circuit by executing, using the corrected standard deviation of the first delay distribution for each element, correlation analysis between delay and leak current of the target circuit; and outputting the obtained correlation distribution.

7 Claims, 17 Drawing Sheets

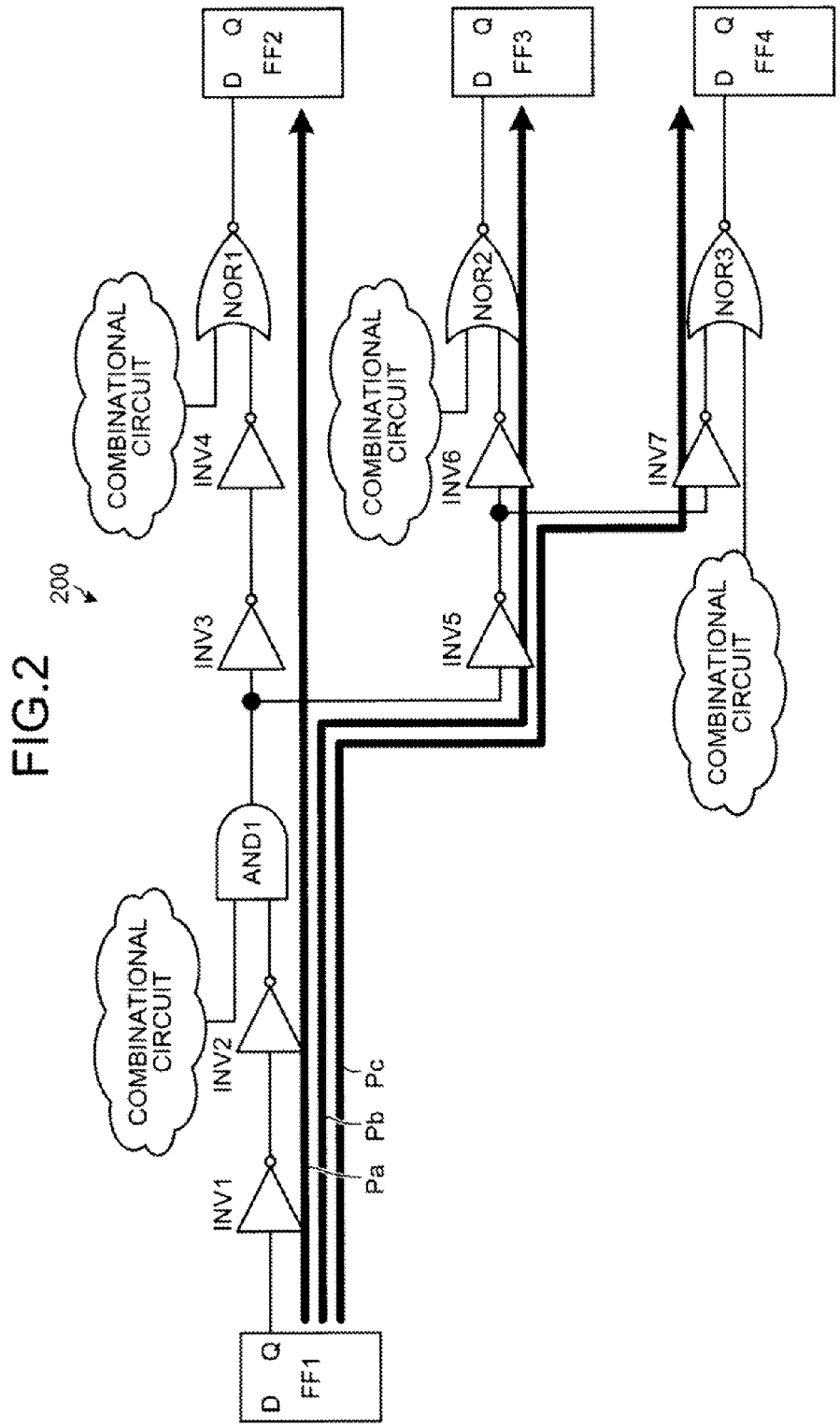

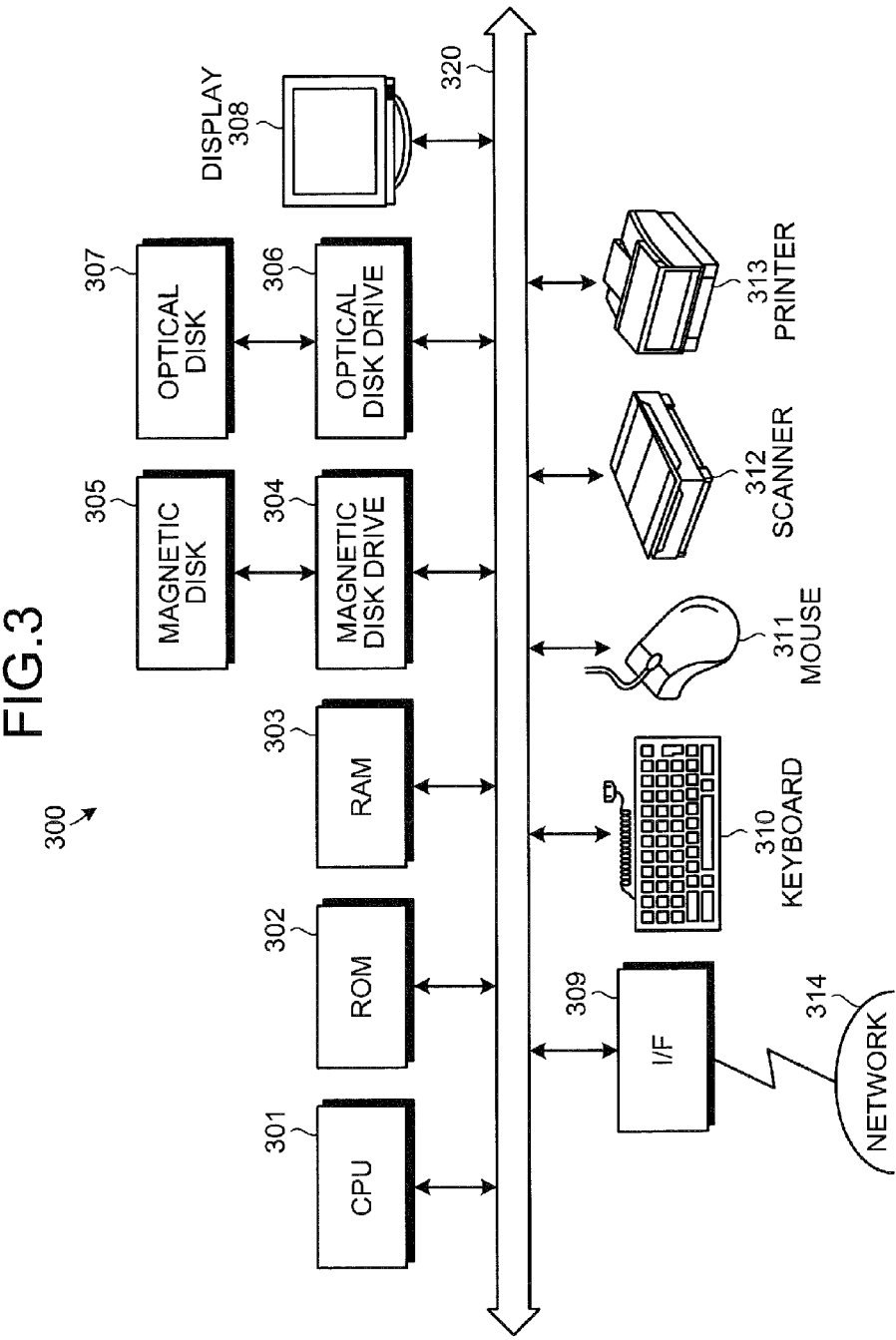

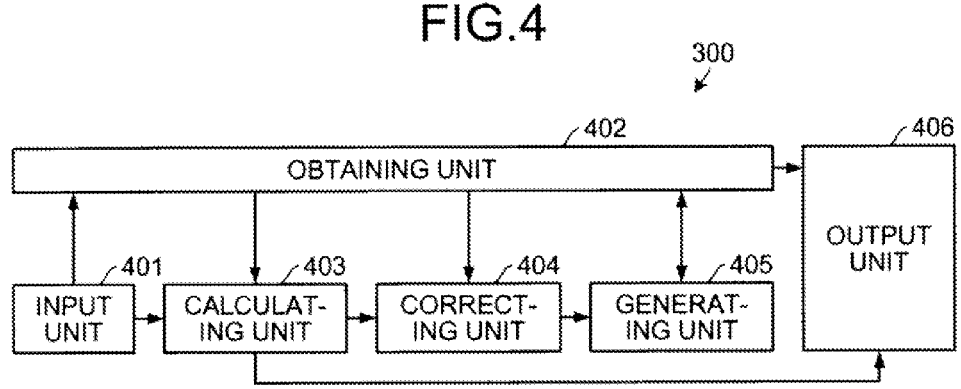
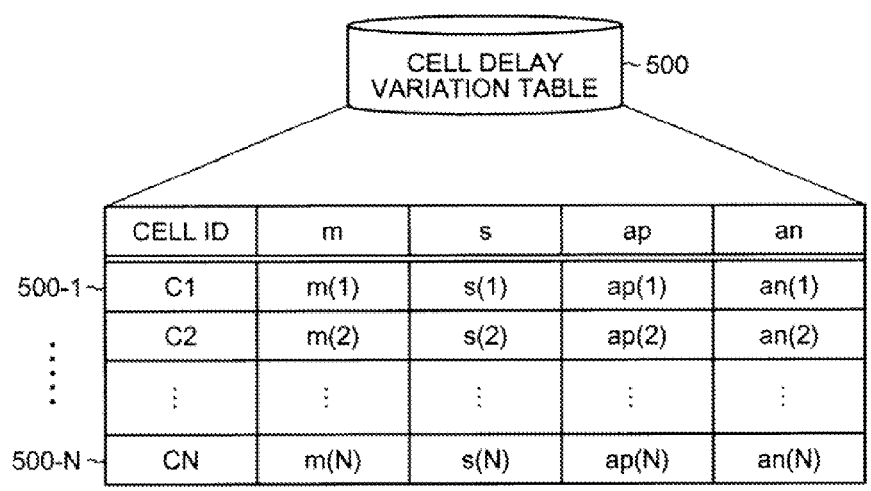

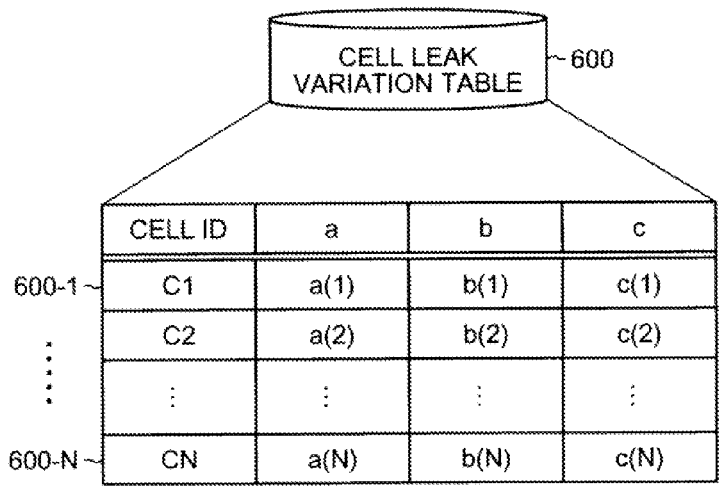
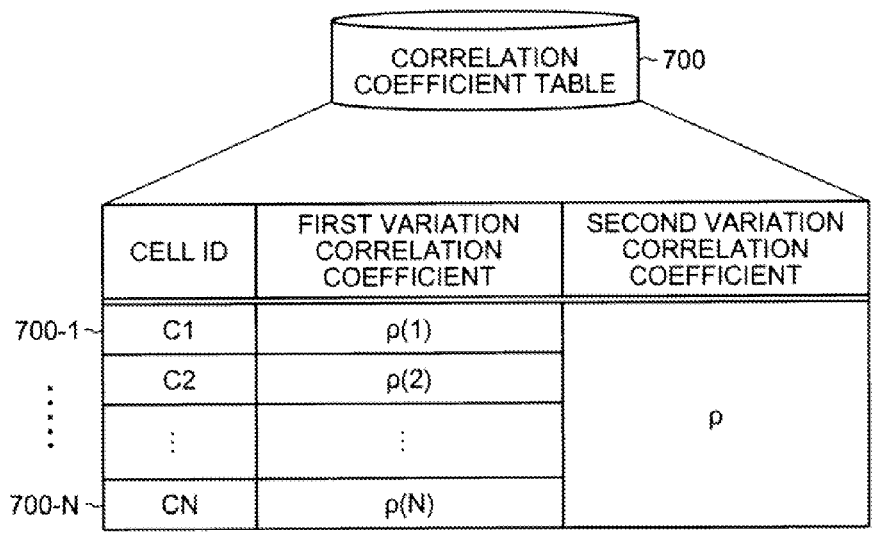

FIG.10

CORRECTED VARIATION TABLE ~1000

| PATH ID | STANDARD DEVIATION OF FIRST DELAY DISTRIBUTION | | | |
|---------|---------|---------|-----|---------|
| P1 | p(1, 1) | p(1, 2) | ... | p(1, n(1)) |
| P2 | p(2, 1) | p(2, 2) | ... | p(2, n(2)) |
| ⋮ | ⋮ | ⋮ | ⋮ | ⋮ |
| PL | p(L, 1) | p(L, 2) | ... | p(L, n(L)) |

LEAK-DELAY CORRELATION TABLE ~1100

| CORRELATION ID | LEAK CURRENT | DELAY |
|---|---|---|
| 1 | I(1) | d(1) |
| 2 | I(2) | d(2) |
| ⋮ | ⋮ | ⋮ |
| K | I(K) | d(K) |

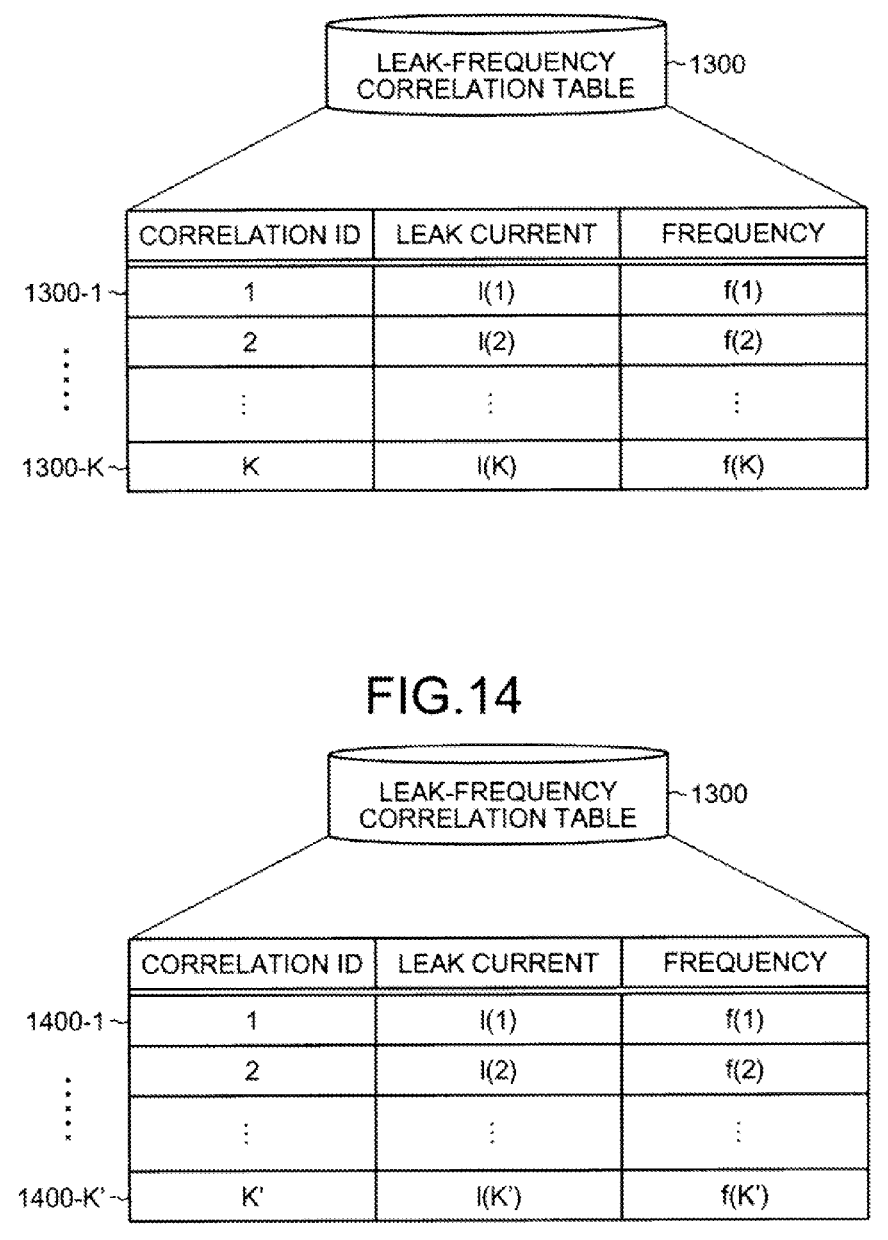

LEAK-FREQUENCY CORRELATION TABLE ~1300

| CORRELATION ID | LEAK CURRENT | FREQUENCY |
|---|---|---|
| 1 | I(1) | f(1) |
| 2 | I(2) | f(2) |
| ⋮ | ⋮ | ⋮ |
| K | I(K) | f(K) |

1300-1 ~ (row 1)
1300-K ~ (row K)

FIG.14

LEAK-FREQUENCY CORRELATION TABLE ~1300

| CORRELATION ID | LEAK CURRENT | FREQUENCY |
|---|---|---|
| 1 | I(1) | f(1) |
| 2 | I(2) | f(2) |
| ⋮ | ⋮ | ⋮ |
| K' | I(K') | f(K') |

1400-1 ~ (row 1)
1400-K' ~ (row K')

FIG.15

| | FREQUENCY | YIELD |
|---|---|---|
| 1500-1 | f(1) | Y(1) |
| | f(2) | Y(2) |
| | ⋮ | ⋮ |
| 1500-K' | f(K') | Y(K') |

FREQUENCY YIELD TABLE ~1500

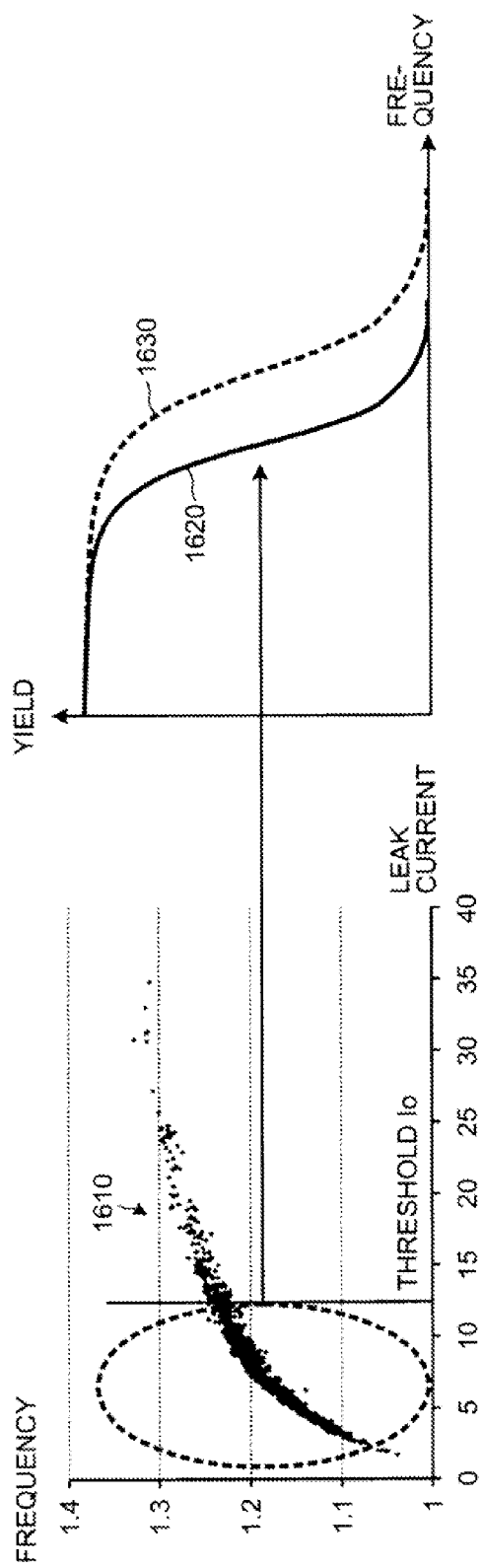

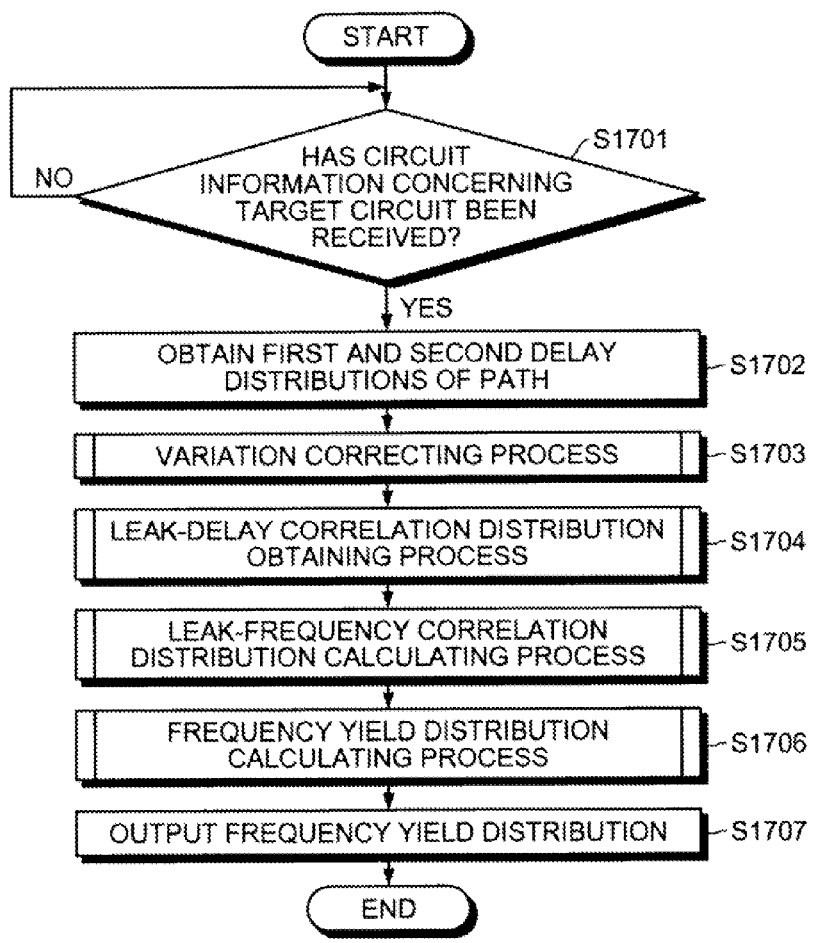

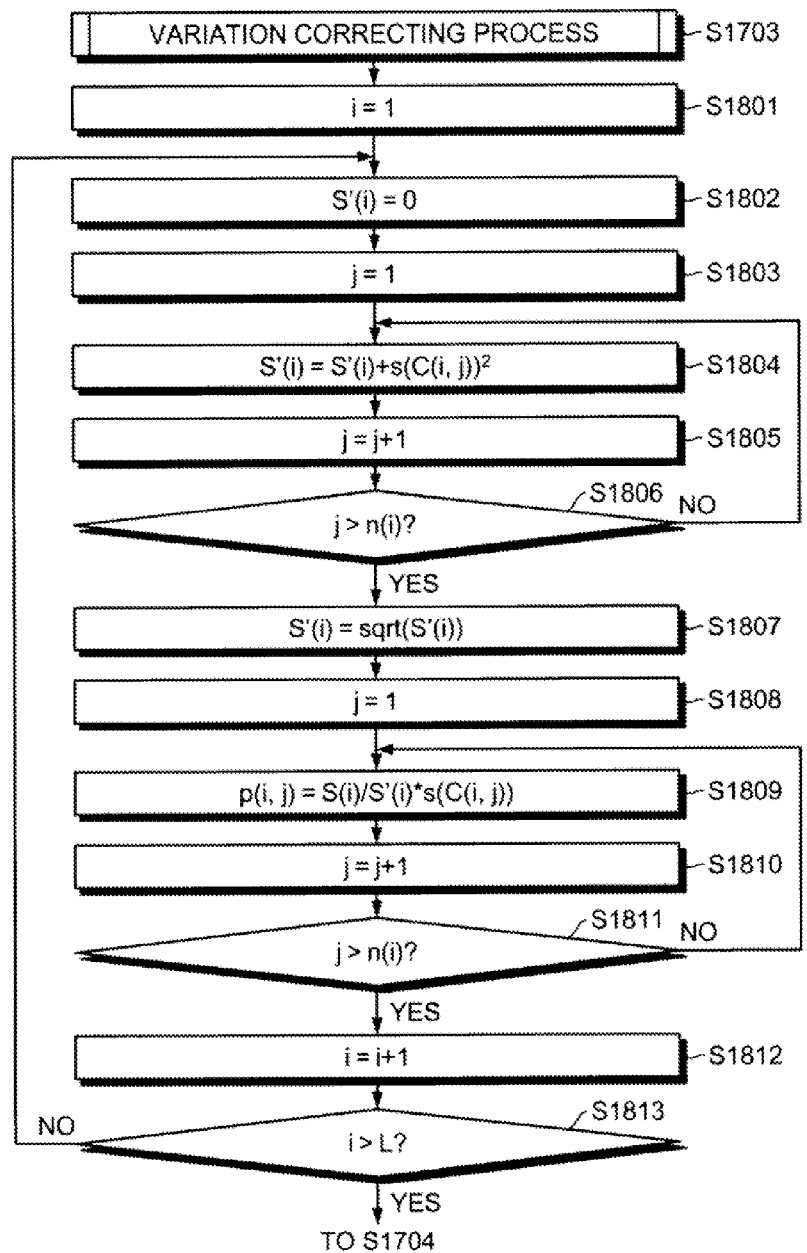

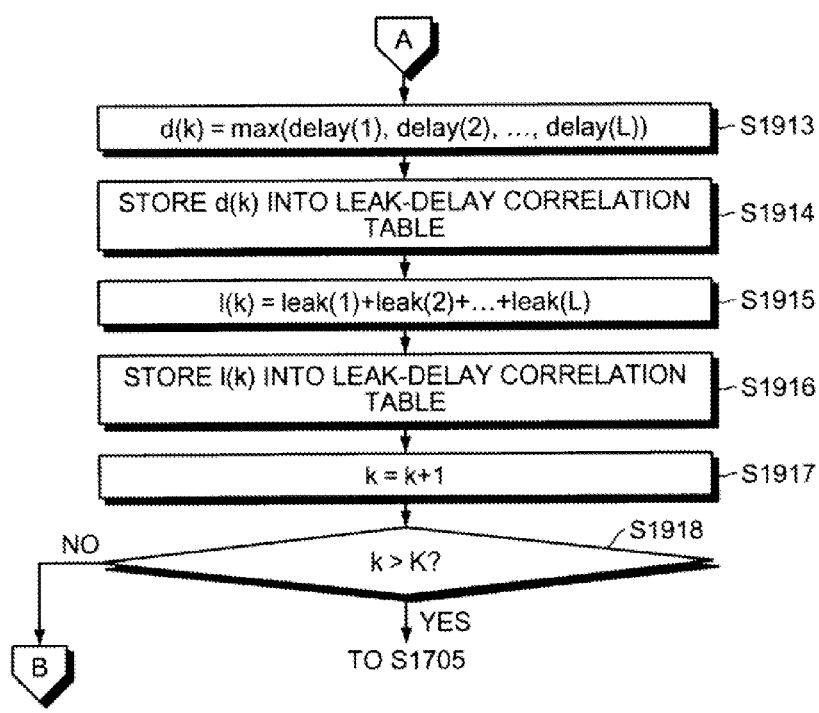

COMPUTER PRODUCT, ANALYSIS SUPPORT APPARATUS, AND ANALYSIS SUPPORT METHOD

CROSS-REFERENCE TO RELATED APPLICATIONS

This application is based upon and claims the benefit of priority from the prior Japanese Patent Application No. 2009-268121, filed on Nov. 25, 2009, the entire contents of which are incorporated herein by reference.

FIELD

The embodiments discussed herein are related to correlation analysis between delay and leak current of a target circuit.

BACKGROUND

Recently, with the miniaturization of semiconductor integrated circuits, variations in delay and leak current (delay variation and leak current variation) due to process have increased. Delay means the time consumed for the input and output of a signal with respect to an element or between elements in a circuit. A leak current means a current that leaks at a portion in an electrical circuit where current should not normally flow.

As a technique for taking into consideration such variations and estimating the delay and the leak current of a target circuit with such variations, statistical delay analysis (statistical static timing analysis (SSTA)) and statistical leak analysis have been proposed. SSTA is a technique for adjusting estimation of timing by providing the variation of delay of each element in the target circuit as a probability density distribution, and treating the delay of the entire circuit statistically.

On the other hand, the delay variation and the leak current variation are known to have a correlation with each other since both are caused by the process. For example, the delay and the leak current have a trade-off relationship in which the smaller the delay is, the greater the leak current becomes. Thus, the correlation between delay and leak current needs to be analyzed for accurate yield analysis of the target circuit.

Conventionally, as a technique for correlation analysis between delay and leak current, a Monte Carlo simulation has been proposed in which a delay analysis tool (static timing analysis (STA)) and a leak analysis tool are iteratively executed. In correlation analysis between delay and leak current, an approximation technique has also been proposed in which the delay distribution is modeled as a normal distribution (see, for example, Srivastava, Ashish, et al, "Accurate and Efficient Gate-Level Parametric Yield Estimation Considering Correlated Variations in Leakage Power and Performance," Proc. DAC2005, p. 535-540).

However, in the Monte Carlo simulation, for accurate correlation analysis, the delay analysis tool and the leak analysis tool need to be iteratively executed several thousands of times, consuming more time for the correlation analysis and thus resulting in a longer time period for design.

On the other hand, according to the technique in which the delay distribution is modeled as a normal distribution, the accuracy of analysis may be reduced with respect to a circuit that includes many subcircuits operating in parallel, since the delay distribution of the entire circuit is likely to become a non-normal distribution, resulting in a re-execution of the circuit design, an increased load on the designer, and a longer design period.

SUMMARY

According to an aspect of an embodiment, a non-transitory, computer-readable recording medium stores therein an analysis support program causing a computer to execute calculating, using respective standard deviations of first delay distributions of delay variation independent to each element included in a path among a plurality of parallel paths in a target circuit, standard deviation of a first delay distribution of the path when the path is modeled as a series circuit; correcting the standard deviation of the first delay distribution for each element, using the calculated standard deviation of the first delay distribution of the path and standard deviation of a first delay distribution of the path obtained by a statistical delay analysis on the target circuit; obtaining a correlation distribution representing a correlation between delay and leak current of the target circuit by executing, using the corrected standard deviation of the first delay distribution for each element, correlation analysis between delay and leak current of the target circuit; and outputting the obtained correlation distribution.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a circuit diagram of an exemplary target circuit.

FIG. 3 is a block diagram of a hardware configuration of an analysis support apparatus according to the embodiments.

FIG. 4 is a functional block diagram of the analysis support apparatus.

FIG. 5 depicts an example of contents stored in a cell delay variation table.

FIG. 6 depicts an example of contents stored in a cell leak variation table.

FIG. 7 depicts an example of contents stored in the correlation coefficient table.

FIG. 10 depicts an example of contents stored in the corrected variation table.

FIG. 11 depicts an example of contents stored in a leak-delay correlation table.

FIG. 13 depicts an example of contents stored in a leak-frequency correlation table.

FIG. 14 depicts an example of contents stored in the leak-frequency correlation table after deletion.

FIG. 15 depicts an example of contents stored in a frequency yield table.

FIG. 16 depicts examples of leak-frequency correlation distribution and frequency yield distribution.

FIG. 17 is a flowchart of an exemplary procedure of analysis support process performed by the analysis support apparatus.

FIG. 18 is a flowchart of an exemplary procedure of a variation correcting process.

FIGS. 19A and 19B are flowcharts of exemplary procedures of a leak-delay correlation distribution obtaining process.

DESCRIPTION OF EMBODIMENTS

Preferred embodiments of the present invention will be explained with reference to the accompanying drawings.

In the present specification, a target circuit is a circuit that includes plural paths operating in parallel (for example, a processor). A path is a route from one cell to another cell in the target circuit. A cell is a circuit element included in the target circuit such as a NOT gate, an AND gate, a wiring, a buffer, an inverter (INV), and a flip-flop (FF).

In other words, the path is a route from, for example, one FF to another FF in the target circuit. The path may be a route from a data input terminal to an FF, or a route from an FF to a data output terminal in the target circuit.

Figure 1:
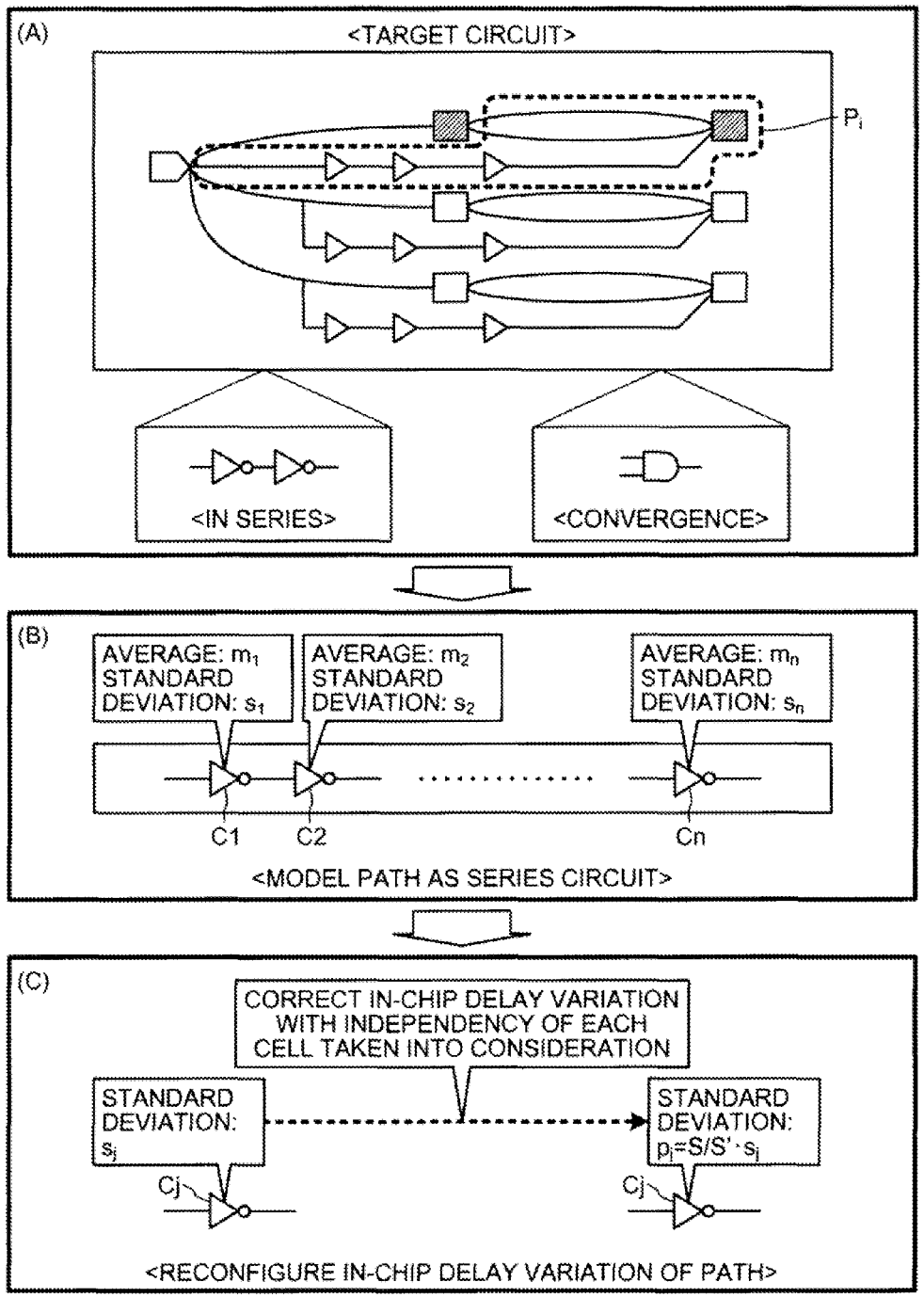
FIG. 1 depicts an exemplary overview of an analysis method.

FIG. 1 depicts an exemplary overview of the analysis method. The analysis method seeks to reduce the processing time while achieving accurate correlation analysis between delay and leak current of the target circuit. Variations with respect to the delay and the leak current of the target circuit include a variation that is independent to each cell in the target circuit and a variation that is common to all cells in the target circuit.

Variations of delay include a first delay variation independent to each cell and a second delay variation common to all cells. Thus, the delay variation of cell can be represented using these first and the second delay variations. The delay variation of a cell can be represented by, for example, equation (1) below.

Where, $d_C$ represents the delay variation of the cell; $\alpha$ represents a parameter of the first delay variation; $\beta$ represents a parameter of the second delay variation; m represents the average of a first delay distribution of cell based on the first delay variation; s represents the standard deviation of the first delay distribution; and $a_p$ and $a_n$ represent standard deviations of a second delay distribution of cell based on the second delay variation.

$$d_C = m + s \times \alpha + f(\beta)$$
$$f(\beta) = a_p \times \beta \ (\beta \geq 0), f(\beta) = a_n \times \beta \ (\beta < 0) \quad (1)$$

Variations of leak current include a first leak current variation independent to each cell and a second leak current variation common to all cells. Thus, the leak current variation of a cell can be represented using the first and the second leak current variations. The leak current variation of a cell can be represented by, for example, equation (2) below.

Where, $l_C$ represents the leak current variation of cell; $\alpha'$ represents a parameter of the first leak current variation; $\beta'$ represents a parameter of the second leak current variation; and a, b, and c are coefficients specific to each cell.

$$l_C = \exp(a + b \times \alpha' + c \times \beta') \quad (2)$$

$\alpha$, $\alpha'$, $\beta$, and $\beta'$ are random variables that follow, for example, a standard normal distribution with the average of 0 and the standard deviation of 1. $\alpha$ and $\alpha'$ have a correlation with the correlation coefficient of $\rho\alpha$. The correlation coefficient $\rho\alpha$ is specific to each cell in the target circuit. $\beta$ and $\beta'$ have a correlation with the correlation coefficient of $\rho$. The correlation coefficient $\rho$ is common to all cells in the target circuit.

Generally, due to correlations among cells, the first delay variation and the second delay variation of each cell need to be taken into consideration in the correlation analysis between delay and leak current of the target circuit. However, the correlation analysis becomes complicated since in a logic circuit in the target circuit, cells are connected not only "in series," but also connected such that several signals are input into one cell ("convergence") (A).

Thus, in the analysis method, each path in the target circuit is modeled as a series circuit in which the cells in the path are connected in series (B). In the analysis method, the first delay variation of a path is configured to be the sum of the first delay variations of the cells in the path using, for example, equation (3) below.

Path $P_i$ represents an arbitrary path in the target circuit; $d_{intra}$ represents the first delay variation of path $P_i$; M' represents the average of the first delay distribution of path $P_i$; $\alpha_j$ represents a parameter of the first delay variation of an arbitrary cell $C_j$ in path $P_i$; and $s_j$ represents the standard deviation of the first delay distribution of cell $C_j$ (j=1, 2, ..., n).

$$d_{intra} = M' + s_1 \times \alpha_1 + s_2 \times \alpha_2 + \ldots + s_j \times \alpha_j + \ldots + s_n \times \alpha_n \quad (3)$$

Thus, the delay variation of path $P_i$ can be represented by equation (4) below, where $d_i$ represents the delay variation of path $P_i$; M' represents the average of the first delay distribution of path $P_i$; $f(\beta)$ represents the second delay variation of path $P_i$; and $A_p$ and $A_n$ represent standard deviations of the second delay distribution of path $P_i$ based on the second delay variation.

$$d_i = M' + s_1 \times \alpha_1 + s_2 \times \alpha_2 + \ldots + s_j \times \alpha_j + \ldots + s_n \times \alpha_n + f(\beta)$$
$$f(\beta) = A_p \times \beta \ (\beta \geq 0), f(\beta) = A_n \times \beta \ (\beta < 0) \quad (4)$$

Thus, in the analysis method, the first delay variation of path $P_i$ is configured to be the sum of the first delay variations of cells $C_j$ in path $P_i$, thereby simplifying the correlation analysis between delay and leak current of the target circuit, and reducing the time consumed for the correlation analysis.

However, the accuracy of the correlation analysis is reduced if each path in the target circuit is simply modeled as a series circuit. Thus, in the analysis method, the first delay variation $d_{intra}$ of path $P_i$ is reconfigured so as to coincide with the average M and the standard deviation S of the first delay distribution of path $P_i$ that are obtained by an existing SSTA method.

Typically, the average and the standard deviation of the first delay variation of the entire series circuit are represented by equations (5) and (6) below. Equation (6) is based on the characteristics that the first delay variations of cells $C_j$ in path $P_i$ are mutually independent. M' represents the average of the first delay distribution of the entire series circuit; S' represents the standard deviation of the first delay distribution of the entire series circuit; $m_j$ represents the average of the first delay distribution of cell $C_j$.

$$M' = m_1 + m_2 + \ldots + m_n \quad (5)$$

$$S'^2 = s_1^2 + s_2^2 + \ldots + s_n^2 \quad (6)$$

In the analysis method, the first delay distribution and the second delay distribution of path $P_i$ are calculated by an SSTA method, and the average M of the first delay distribution of path $P_i$ calculated by the SSTA method is used as the average M' of the first delay distribution of path $P_i$ in equation (3), in place of M' calculated by equation (5).

Further, in the analysis method, the standard deviation Sj of the first delay distribution of cell $C_j$ is corrected using the standard deviation S of the first delay distribution of path $P_i$ calculated by SSTA and equation (6) above (C). In the analysis method, the standard deviation sj of the first delay distribution of cell $C_j$ is corrected using, for example, equation (7) below, where pj represents the corrected standard deviation of the first delay distribution of cell $C_j$.

$$p_j=(S/S')\times s_j \quad (7)$$

Consequently, the delay variation of path $P_i$ is represented by equation (8) below.

$$d_i=M+p_1\times\alpha_1+p_2\times\alpha_2+\ldots+p_j\times\alpha_j+\ldots+p_n\times\alpha_n+f(\beta)$$

$$f(\beta)=A_p\times\beta \; (\beta\geq 0), f(\beta)=A_n\times\beta \; (\beta<0) \quad (8)$$

Thus, in the analysis method, path $P_i$ is modeled as a series circuit and the first delay variation $d_{intra}$ of path $P_i$ is reconfigured so as to coincide with the average M and the standard deviation S of the first delay distribution of path $P_i$ calculated by SSTA method, thereby reducing the time consumed for the correlation analysis between delay and leak current of the target circuit while achieving accuracy in the correlation analysis.

FIG. 2 is a circuit diagram of an exemplary target circuit. In the figure, only a part of the target circuit is illustrated. As depicted in FIG. 2, the target circuit 200 includes paths Pa to Pc. In the analysis method, at least one of the paths Pa and Pc in the target circuit 200 is modeled as a series circuit, and the correlation analysis between delay and leak current is executed.

In the target circuit 200, a path Pa is a route defined as: FF1⇒INV1⇒INV2⇒AND1⇒INV3⇒INV4⇒NOR1⇒FF2. A path Pb is a route defined as: FF1⇒INV1⇒INV2⇒AND1⇒INV5⇒INV6⇒NOR2⇒FF3. A path Pc is a route defined as: FF1⇒INV1⇒INV2⇒AND1⇒INV5⇒INV7⇒NOR3⇒FF4.

FIG. 3 is a block diagram of a hardware configuration of an analysis support apparatus according to the embodiments. As depicted in FIG. 3, an analysis support apparatus 300 includes a central processing unit (CPU) 301, a read-only memory (ROM) 302, a random access memory (RAM) 303, a magnetic disk drive 304, a magnetic disk 305, an optical disk drive 306, an optical disk 307, a display 308, an interface (I/F) 309, a keyboard 310, a mouse 311, a scanner 312, and a printer 313, respectively connected by a bus 320.

The CPU 301 governs overall control of the analysis support apparatus 300. The ROM 302 stores therein programs such as a boot program. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer.

The display 308 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 308.

The I/F 309 is connected to a network 314 such as a local area network (LAN), a wide area network (WAN), and the Internet through a communication line and is connected to other apparatuses through the network 314. The I/F 309 administers an internal interface with the network 314 and controls the input/output of data from/to external apparatuses. For example, a modem or a LAN adapter may be employed as the I/F 309.

The keyboard 310 includes, for example, keys for inputting letters, numerals, and various instructions and performs the input of data. Alternatively, a touch-panel-type input pad or numeric keypad, etc. may be adopted. The mouse 311 is used to move the cursor, select a region, or move and change the size of windows. A track ball or a joy stick may be adopted provided each respectively has a function similar to a pointing device.

The scanner 312 optically reads an image and takes in the image data into the analysis support apparatus 300. The scanner 312 may have an optical character recognition (OCR) function as well. The printer 313 prints image data and text data. The printer 313 may be, for example, a laser printer or an ink jet printer.

FIG. 4 is a functional block diagram of the analysis support apparatus 300. As depicted in FIG. 4, the analysis support apparatus 300 includes an input unit 401, an obtaining unit 402, a calculating unit 403, a correcting unit 404, a generating unit 405, and an output unit 406. These functions (the input unit 401 to the output unit 406) functioning as a controller are implemented, for example, through the I/F 309 or by causing the CPU 301 to execute a program stored in a storage device such as the ROM 302, the RAM 303, the magnetic disk 305, and the optical disk 307 depicted in FIG. 3.

Hereinafter, if not otherwise specified, cells in the target circuit are referred to as "cells C1 to CN," and paths in the target circuit are referred to as "paths P1 to PL."

The input unit 401 receives input of circuit information concerning the target circuit. The circuit information includes, for example, a netlist, variation data (see FIGS. 5 and 6), correlation data (see FIG. 7), and in-path cell data (see FIG. 8), etc., concerning the target circuit. The input unit 401 receives the input of the circuit information via user operation of, for example, the keyboard 310 and the mouse 311 depicted in FIG. 3. The input unit 401 may obtain the circuit information by reception from an external computer, or by extraction from a database or a library (not shown).

The netlist is electronic data indicating the cells in the target circuit and the connection thereof. The variation data are model data concerning the first delay variation and the second delay variation of each of the cells C1 to CN. The variation data are stored in, for example, a cell delay variation table 500 depicted in FIG. 5 and a cell leak variation table 600 depicted in FIG. 6.

The correlation data are information representing the correlation between delay and leak current of the target circuit. The correlation data are stored in, for example, a correlation coefficient table 700 depicted in FIG. 7. The in-path cell data are information for specifying cell(s) in path $P_i$. The in-path cell data are stored in, for example, an in-path cell table 800 depicted in FIG. 8.

FIG. 5 depicts an example of contents stored in the cell delay variation table. As depicted in FIG. 5, the cell delay variation table 500 includes fields of cell ID, m, s, $a_p$, and $a_n$. Delay variation data 500-1 to 500-N of cells C1 to CN are stored as records by setting information in each field.

The cell ID is an identifier of cells C1 to CN in the target circuit. m is the average of the first delay distribution of each of the cells C1 to CN. s is the standard deviation of the first delay distribution of each of the cells C1 to CN. $a_p$ and $a_n$ are standard deviations of the second delay distribution of each of the cells C1 to CN, where $a_p$ is the standard deviation when the parameter β of the second delay variation is equal to or greater than β ($\beta\geq 0$), while $a_n$ is the standard deviation when the parameter β of the second delay variation is smaller than β ($\beta<0$).

Delay variations of cells C1 to CN can be represented by substituting delay variation data 500-1 to 500-N corresponding to cells C1 to CN into equation (1) above, respectively. For example, the delay variation of cell C1 is represented as: $d_c = m(1) + s(1) \times \alpha + f(\beta)$, where $f(\beta) = a_p(1) \times \beta$ when $\beta \geq 0$, while $f(\beta) = a_n(1) \times \beta$ when $\beta < 0$.

FIG. 6 depicts an example of contents stored in the cell leak variation table. As depicted in FIG. 6, the cell leak variation table 600 includes fields of cell ID, a, b, and c. Leak variation data 600-1 to 600-N of cells C1 to CN are stored as records by setting information in each field.

The cell ID is an identifier of cells C1 to CN in the target circuit. a, b, and c are coefficients concerning leak current variation specific to the cells C1 to CN. Leak current variations of cells C1 to CN can be represented by substituting leak variation data 600-1 to 600-N corresponding to cells C1 to CN into equation (2) above, respectively. For example, the leak current variation of cell C1 is represented as: $l_c = \exp(a(1) + b(1) \times \alpha' + c(1) \times \beta')$.

FIG. 7 depicts an example of contents stored in the correlation coefficient table. As depicted in FIG. 7, the correlation coefficient table 700 includes fields of cell ID, first variation correlation coefficient, and second variation correlation coefficient. Correlation data 700-1 to 700-N of cells C1 to CN are stored as records by setting information in each field.

The cell ID is an identifier of cells C1 to CN in the target circuit. The first variation correlation coefficient is a correlation coefficient representing the correlation between the parameter $\alpha$ of the first delay variation and the parameter $\alpha'$ of the first leak current variation. The second variation correlation coefficient is a correlation coefficient representing the correlation between the parameter $\beta$ of the second delay variation and the parameter $\beta'$, of the second leak current variation.

For example, the correlation coefficient representing the correlation between the parameter $\alpha$ of the first delay variation and the parameter $\alpha'$ of the first leak current variation of cell C1 is $\rho(1)$. When $\rho(1)$ is equal to 1 ($\rho(1)=1$), $\alpha$ becomes equal to $\alpha'$ ($\alpha=\alpha'$). The correlation coefficient representing the correlation between the parameter $\beta$ of the second delay variation and the parameter $\beta'$ of the second leak current variation of cell C1 is $\rho$.

Figure 8:
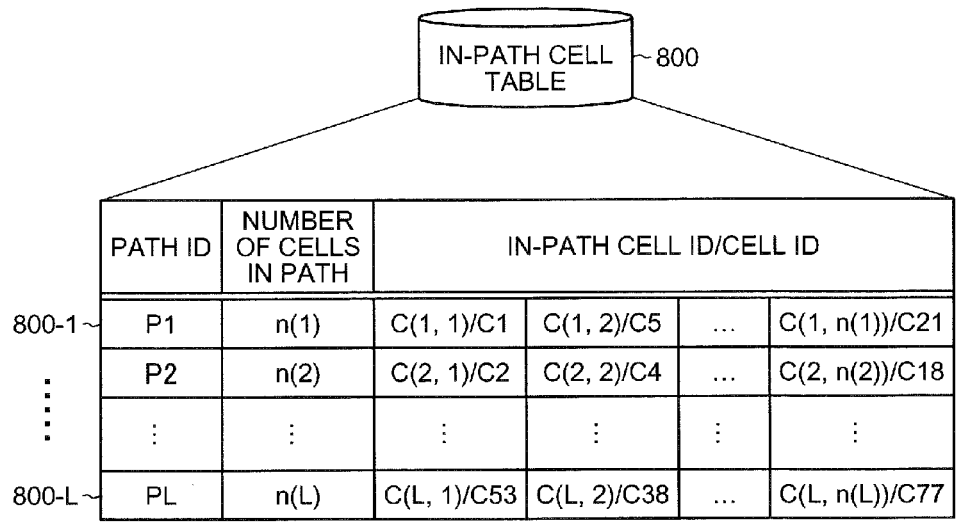
FIG. 8 depicts an example of contents stored in an in-path cell table.

FIG. 8 depicts an example of contents stored in the in-path cell table 800. As depicted in FIG. 8, the in-path cell table 800 includes fields of path ID, number of cells in path, and in-path cell ID/cell ID. In-path cell data 800-1 to 800-L of paths P1 to PL are stored as records by setting information in each field.

The path ID is an identifier of paths P1 to PL in the target circuit. The number of cells in path is the total number of cells included in each of the paths P1 to PL. The in-path cell ID/cell ID is an identifier of cells in paths P1 to PL.

The in-path cell ID (path ID, cell number) is a cell number for identifying cells in paths. The cell number is, for example, the order of the cell from the top of the path. The cell ID is an identifier of cells C1 to CN. For example, C(1,2)/C5 represents the second cell C5 from the top of path P1.

The tables depicted in FIGS. 5 to 8 are stored in a storage device such as the ROM 302, the RAM 303, the magnetic disk 305, and the optical disk 307 depicted in FIG. 3. The in-path cell data (see FIG. 8) need not be input into the analysis support apparatus 300, and may be generated, for example, in the analysis support apparatus 300 based on the netlist concerning the target circuit.

The reference of the description returns to FIG. 4. The obtaining unit 402 obtains the first delay distribution and the second delay distribution of each path $P_i$ in the target circuit by execution of a statistical delay analysis of the target circuit.

The obtaining unit 402 provides, for example, a simulator that executes SSTA with the circuit information of the target circuit, and obtains the first delay distribution and the second delay distribution of each path $P_i$ as a result of SSTA.

The simulator may be included in the analysis support apparatus 300, or in an external computer. If the simulator is included in an external computer, the obtaining unit 402 sends the circuit information of the target circuit to the external computer, and obtains the analysis result from the external computer. The obtained SSTA result is stored in, for example, a SSTA result table 900 depicted in FIG. 9.

Figure 9:
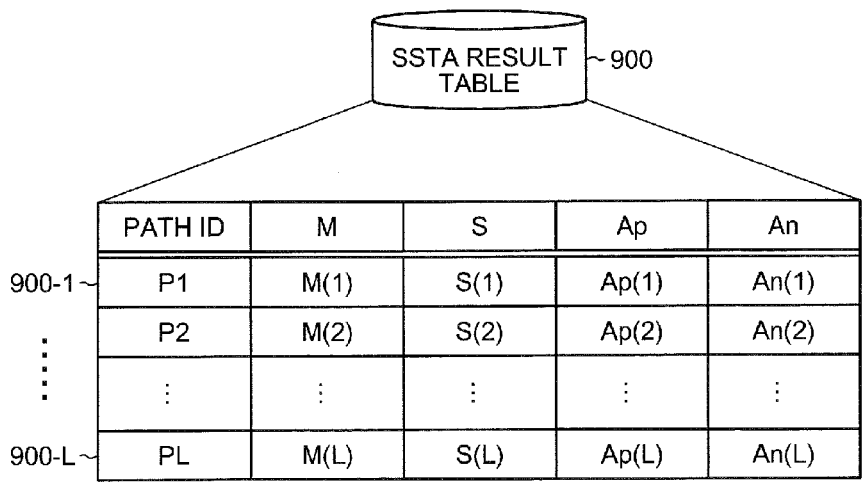
FIG. 9 depicts an example of contents stored in the SSTA result table.

FIG. 9 depicts an example of contents stored in the SSTA result table. As depicted in FIG. 9, the SSTA result table 900 includes fields of path ID, M, S, $A_p$, and A. SSTA results 900-1 to 900-L of paths P1 to PL are stored as records by setting information in each field.

The path ID is an identifier of paths P1 to PL in the target circuit. M is the average of the first delay distribution of path $P_i$. S is the standard deviation of the first delay distribution of path $P_i$. $A_p$ and $A_n$ are standard deviations of the second delay distribution of path $P_i$, where $A_p$ is the standard deviation when the parameter $\beta$ of the second delay variation is equal to or greater than 0 ($\beta \geq 0$), while $A_n$ is the standard deviation when the parameter $\beta$ of the second delay variation is smaller than 0 ($\beta < 0$). The SSTA result table 900 is stored in a storage device such as the ROM 302, the RAM 303, the magnetic disk 305, and the optical disk 307.

The reference of the description returns to FIG. 4. The calculating unit 403 calculates the standard deviation S'(i) of the first delay distribution of path $P_i$ when path $P_i$ in the target circuit is modeled as a series circuit. The calculating unit 403 calculates the standard deviation S'(i) of the first delay distribution of path $P_i$ using, for example, the standard deviation s(C(i,j)) of the first delay distribution of a cell C(i,j) in path $P_i$. The standard deviation s(C(i,j)) is the standard deviation of one of the cells C1 to CN corresponding to the in-path cell ID "C(i,j)" (j=1, 2, . . . , n(i)).

The calculating unit 403 refers to, for example, the in-path cell table 800 and identifies cells C(i,1) to C(i,n(i)) included in path $P_i$. The calculating unit 403 refers to the cell delay variation table 500 and identifies standard deviations s(C(i,1)) to s(C(i,n(i))) of cells C(i,1) to C(i,n(i)).

The calculating unit 403 calculates standard deviation S'(i) of the first delay distribution of path $P_i$ by substituting standard deviations s(C(i,1)) to s(C(i,n(i))) into equation (9) below, and calculating the square root thereof. The calculated standard deviation S'(i) of the first delay distribution of path $P_i$ is stored in a storage device such as the RAM 303, the magnetic disk 305, and the optical disk 307.

$$S(i)'^2 = s(C(i,1))^2 + s(C(i,2))^2 + \ldots + s(C(i,n(i)))^2 \qquad (9)$$

The correcting unit 404 corrects standard deviation s(C(i,j)) of the first delay distribution of cell C(i,j) in path $P_i$ using the calculated standard deviation S'(i) of the first delay distribution of path $P_i$ and the obtained standard deviation S(i) of the first delay distribution of path $P_i$. The correcting unit 404 corrects standard deviation s(C(i,j)) of the first delay distribution of cell C(i,j) using, for example, equation (10) below, where p(i,j) is the corrected standard deviation of the first delay distribution of cell C(i,j).

$$p(i,j) = (S(i)/S'(i)) \times s(C(i,j)) \qquad (10)$$

The corrected standard deviation p(i,j) of the first delay distribution of cell C(i,j) is stored in, for example, a corrected variation table 1000 depicted in FIG. 10.

FIG. 10 depicts an example of contents stored in the corrected variation table. As depicted in FIG. 10, the corrected variation table 1000 includes fields of path ID and standard deviation of first delay distribution. Corrected variation data 1000-1 to 1000-L of paths P1 to PL are stored as records by setting information in each field.

The path ID is an identifier of paths P1 to PL in the target circuit. The standard deviation of the first delay distribution is the corrected standard deviation p(i,j) of the first delay distribution of cell C(i,j) in each path $P_i$. The corrected variation table 1000 is stored in a storage device such as the ROM 302, the RAM 303, the magnetic disk 305, and the optical disk 307.

The reference of the description returns to FIG. 4. The generating unit 405 generates a function model representing the delay variation of path $P_i$ using the corrected standard deviation p(i,j) of the first delay distribution of cell C(i,j) and the obtained first and second delay distributions of path $P_i$. The generating unit 405 generates the function model representing the delay variation of path $P_i$ using, for example, equation (11) below.

$\alpha j$ represents a parameter of the first delay variation specific to cell C(i,j); $\beta$ represents a parameter of the second delay variation common to all cells C1 to CN; M(i) represents the average of the first delay distribution of path $P_i$ calculated by SSTA; and $A_p$ and $A_n$ are standard deviations of the second delay distribution of path $P_i$ calculated by SSTA.

$$d(i)=M(i)+p(i,1)\times\alpha_1+p(i,2)\times\alpha_2+\ldots+p(i,n(i))\times\alpha_n(i)+f(\beta)$$

$$f(\beta)=[[A_p(1)]]A_p(i)\times\beta\ (\beta\geq 0), f(\beta)=[[A_n(1)]]A_n(i)\times\beta\ (\beta<0) \quad (11)$$

The generating unit 405 also generates a function model representing the leak current variation of path $P_i$ based on the leak current variation specific to each cell in the target circuit and the leak current variation common to all cells in the target circuit. The generating unit 405 generates the function model representing the leak current variation of path $P_i$ using, for example, equation (12) below.

$\alpha'j$ represents a parameter of the first leak current variation specific to cell C(i,j); $\beta'$ represents a parameter of the second leak current variation common to all cells C1 to CN; and a(C(i,j)), b(C(i,j)), and c(C(i,j)) are coefficients concerning leak current variation specific to cell C(i,j). These coefficients are retrieved from the cell leak variation table 600 using the cell ID corresponding to cell C(i,j) stored in the in-path cell table 800.

$$l(i)=\exp(a(C(i,1))+b(C(i,1))\times\alpha'_1+c(C(i,1))\times\beta'_1)+\exp(a(C(i,2))+b(C(i,2))\times\alpha'_2+c(C(i,2))\times\beta'_2)+\ldots+\exp(a(C(i,n(i)))+b(C(i,n(i))))\times\alpha'_n(i)+c(C(i,n(i)))\times\beta'_n(i)) \quad (12)$$

The obtaining unit 402 obtains the correlation distribution between delay and leak current of the target circuit. The obtaining unit 402 provides, for example, a simulator that executes a Monte Carlo simulation with the circuit information concerning the target circuit, the corrected variation data 1000-1 to 1000-L, and the generated function model. As a result of the simulation, the obtaining unit 402 obtains the leak-delay correlation distribution between delay and leak current of the target circuit from the simulator.

The details of the correlation analysis between delay and leak current of the target circuit will be described with reference to FIGS. 19A and 19B. The simulator may be included in the analysis support apparatus 300, or in an external computer. The obtained correlation distribution is stored in, for example, a leak-delay correlation table 1100 depicted in FIG. 11.

FIG. 11 depicts an example of contents stored in the leak-delay correlation table. As depicted in FIG. 11, the leak-delay correlation table 1100 includes fields of correlation ID, leak current, and delay. Leak-delay correlation data 1100-1 to 1100-K are stored as records by setting information in each field.

The correlation ID is an identifier of the results of analysis of k-th Monte Carlo simulation (k=1, 2, . . . , K). K is the number of repetition for which the Monte Carlo simulation is executed. The leak current is an analytical value representing the leak current of the target circuit and expressed in a unit of, for example, [mA]. The delay is an analytical value representing the delay of the target circuit and expressed in a unit of, for example, [ps]. The leak-delay correlation table 1100 is stored in a storage device such as the ROM 302, the RAM 303, the magnetic disk 305, and the optical disk 307.

The output unit 406 outputs the obtained correlation distribution. The output unit 406 may display, for example, the leak-delay correlation data 1100-1 to 1100-K in the leak-delay correlation table 1100 depicted in FIG. 11 as a graph on the display 308 (see FIG. 12).

The correlation distribution may be displayed on the display 308, output to the printer 313 to be printed out, sent to an external device via the I/F 309, or stored in a storage device such as the RAM 303, the magnetic disk 305, and the optical disk 307.

Figure 12:
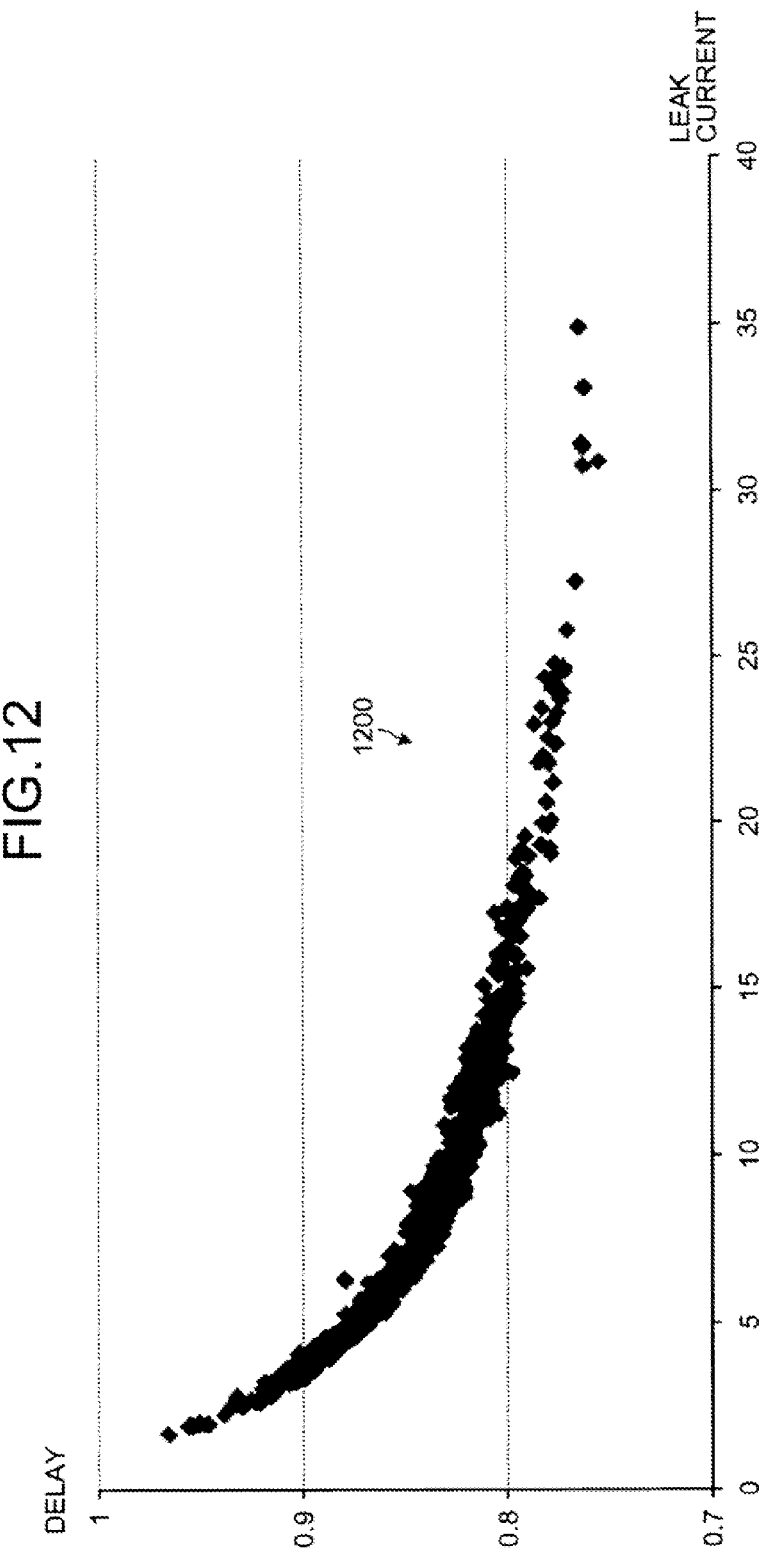
FIG. 12 depicts an example of leak-delay correlation distribution.

FIG. 12 depicts an example of the leak-delay correlation distribution. A leak-delay correlation distribution 1200 depicted in FIG. 12 is a graph representing the correlation between delay and leak current of the target circuit. K points corresponding to the number of repetitions K of the Monte Carlo simulation are plotted in the leak-delay correlation distribution 1200. From the leak-delay correlation distribution 1200, for example, the fluctuation of delay of the target circuit due to the fluctuation of leak current caused in the target circuit can be determined.

The reference of the description returns to FIG. 4. The calculating unit 403 calculates a correlation distribution representing the correlation between leak current and the frequency of the target circuit based on the obtained correlation distribution representing the correlation between delay and leak current of the target circuit. The calculating unit 403 calculates the leak-frequency correlation distribution by substituting delay d(k) of the target circuit into, for example, equation (13) below to calculate frequency f(k) of the target circuit.

$$f(k)=1/d(k) \quad (13)$$

The calculated leak-frequency correlation distribution is stored in, for example, a leak-frequency correlation table 1300 depicted in FIG. 13.

FIG. 13 depicts an example of contents stored in the leak-frequency correlation table. As depicted in FIG. 13, the leak-frequency correlation table 1300 includes fields of correlation ID, leak current, and frequency. Leak-frequency correlation data 1300-1 to 1300-K are stored as records by setting information in each field.

The correlation ID is an identifier of the results of analysis of k-th Monte Carlo simulation. The leak current is an analytical value representing the leak current of the target circuit. The frequency is a calculated value representing the frequency of the target circuit and expressed in a unit of, for example, [Hz]. The leak-frequency correlation table 1300 is stored in a storage device such as the ROM 302, the RAM 303, the magnetic disk 305, and the optical disk 307.

The output unit 406 outputs the calculated correlation distribution representing the correlation between leak current and frequency of the target circuit. The output unit 406 may display, for example, the leak-frequency correlation data 1300-1 to 1300-K in the leak-frequency correlation table 1300 depicted in FIG. 13 as a graph on the display 308 (see FIG. 16).

The calculating unit 403 calculates a yield distribution concerning frequency of the target circuit based on the correlation distribution representing the correlation between leak current and frequency of the target circuit. The calculating unit 403 refers to, for example, the leak-frequency correlation table 1300 and sorts frequencies f(1) to f(K) of the target circuit in an ascending order. The calculating unit 403 may calculate the frequency yield distribution concerning frequency of the target circuit using equation (14) below, where Y(k) is a yield at which the frequency of the target circuit becomes equal to or greater than f(k).

$$Y(k)=(K-k+1)/K \qquad (14)$$

The calculating unit 403 may calculate the frequency yield distribution concerning frequency of the target circuit based on frequencies of the target circuit at which leak currents are below a given threshold $l_0$ in the leak-frequency correlation distribution. The calculating unit 403 deletes, for example, leak-frequency correlation data at which leak current l(k) is equal to or greater than the threshold $l_0$ from the leak-frequency correlation table 1300.

The threshold $l_o$ is arbitrarily set based on, for example, required specifications of the target circuit and stored in a storage device such as the RAM 303, the magnetic disk 305, and the optical disk 307. Thus, leak-frequency correlation data concerning chips that do not satisfy the required specifications even if manufactured without defects can be excluded from the calculation of the frequency yield distribution.

FIG. 14 depicts an example of contents stored in the leak-frequency correlation table after the deletion. As depicted in FIG. 14, leak-frequency correlation data 1400-1 to 1400-K' are stored in the leak-frequency correlation table 1300, where K' is the number of items of leak-frequency correlation data in the leak-frequency correlation table 1300 after the deletion.

The calculating unit 403 refers to the leak-frequency correlation table 1300 after the deletion, and sorts frequencies f(1) to f(K') of the target circuit in ascending order. The calculating unit 403 calculates the frequency yield distribution concerning frequency of the target circuit using equation (15) below.

$$Y(k)=(K'-k+1)/K' \qquad (15)$$

Figure 15:
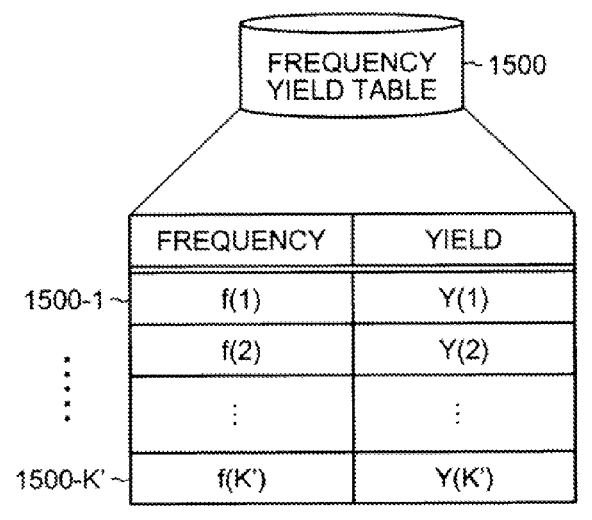

The calculated frequency yield distribution of the target circuit is stored in, for example, a frequency yield table 1500 depicted in FIG. 15. FIG. 15 depicts an example of contents stored in the frequency yield table. As depicted in FIG. 15, the frequency yield table 1500 includes fields of frequency and yield. Yield data 1500-1 to 1500-K' concerning frequency of the target circuit are stored as records by setting information in each field.

The frequency is frequency f(k) of the target circuit (k=1, 2, ..., K'). The yield is a yield at which the frequency of the target circuit becomes equal to or greater than f(k). The frequency yield table 1500 is stored in a storage device such as the ROM 302, the RAM 303, the magnetic disk 305, and the optical disk 307.

The reference of the description returns to FIG. 4. The output unit 406 outputs the calculated yield distribution concerning frequency of the target circuit. The output unit 406 may display, for example, the yield data 1500-1 to 1500-K' in the frequency yield table 1500 depicted in FIG. 15 as a graph on the display 308 (see FIG. 16).

FIG. 16 depicts examples of the leak-frequency correlation distribution and the frequency yield distribution. A leak-frequency correlation distribution 1610 depicted in FIG. 16 is a graph representing the correlation between frequency and leak current of the target circuit. K points corresponding to the number of repetitions K of the Monte Carlo simulation are plotted in the leak-frequency correlation distribution 1610.

From the leak-frequency correlation distribution 1610, for example, the fluctuation of frequency of the target circuit due to the fluctuation of leak current caused in the target circuit can be determined.

Frequency yield distributions 1620 and 1630 depicted in FIG. 16 are graphs representing yields concerning frequency of the target circuit. The frequency yield distribution 1620 is based on the leak-frequency correlation data 1400-1 to 1400-K' (see FIG. 14), while the frequency yield distribution 1630 is based on the leak-frequency correlation data 1300-1 to 1300-K (see FIG. 13).

From the frequency yield distributions 1620 and 1630, for example, the fluctuation of yield of the target circuit due to the fluctuation of frequency of the target circuit can be determined. Further, from the frequency yield distribution 1620 more accurate frequency yield distribution of the target circuit can be determined since the leak-frequency correlation data concerning chips that do not satisfy the required specifications, even if manufactured without defects, are excluded from the calculation.

FIG. 17 is a flowchart of an exemplary procedure of analysis support process performed by the analysis support apparatus 300. As depicted in the flowchart of FIG. 17, it is determined whether the input unit 401 has received input of circuit information concerning a target circuit (step S1701).

Input of the circuit information is waited for (step S1701: NO), and when input of the circuit information is received (step S1701: YES), the obtaining unit 402 obtains the first delay distribution and the second delay distribution of each path $P_i$ in the target circuit by executing SSTA on the target circuit (step S1702).

The correcting unit 404 executes a variation correcting process for correcting standard deviation s(C(i,j)) of the first delay distribution of cell C(i,j) in path $P_i$ (step S1703). The obtaining unit 402 executes a leak-delay correlation distribution obtaining process for obtaining the leak-delay correlation distribution representing the correlation between delay and leak current of the target circuit (step S1704).

The calculating unit 403 executes a leak-frequency correlation distribution calculating process for calculating the leak-frequency correlation distribution of the target circuit based on the obtained leak-delay correlation distribution (step S1705). The calculating unit 403 executes a frequency yield distribution calculating process for calculating the frequency yield distribution of the target circuit based on the calculated leak-frequency correlation distribution (step S1706).

Finally, the output unit 406 outputs the calculated frequency yield distribution of the target circuit (step S1707), and a sequence of processing according to the flowchart ends. Thus, the time consumed for the correlation analysis between delay and leak current of the target circuit can be reduced, while achieving accuracy in the correlation analysis.

FIG. 18 is a flowchart of an exemplary procedure of the variation correcting process performed at step S1703 depicted in FIG. 17.

As depicted in FIG. 18, the calculating unit 403 sets i of path $P_i$ with 1 (i=1) (step S1801), and sets standard deviation S'(i) of the first delay distribution of path $P_i$ with 0 (S'(i)=0) (step S1802).

The calculating unit 403 sets j of cell C(i,j) in path $P_i$ with 1 (j=1) (step S1803), and calculates S'(i)=S'(i)+s(C(i,j))² (step S1804). The calculating unit 403 increments j (step S1805), and determines whether j is greater than the total number n(i) of cells in path $P_i$ (step S1806).

If j is equal to or smaller than n(i) (j≦n(i)) (step S1806: NO), the processing returns to step S1804. On the other hand, if j is greater than n(i) (j>n(i)) (step S1806: YES), the calculating unit 403 calculates S'(i)=sqrt(S'(i)) (step S1807).

The calculating unit 403 sets j of cell C(i,j) with 1 (j=1) (step S1808), and calculates p(i,j)=(S(i)/S'(i))×s(C(i,j)) (step S1809). The calculating unit 403 increments j (step S1810), and determines whether j is greater than n(i) (step S1811).

If j is equal to or smaller than n(i) (j≦n) (step S1811: NO), the processing returns to step S1809. On the other hand, if j is greater than n(i) (j>n(i)) (step S1811: YES), the calculating unit 403 increments i (step S1812), and determines whether i is greater than the total number L of paths in the target circuit (step S1813).

If i is equal to or smaller than L (i≦L) (step S1813: NO), the processing returns to step S1802. On the other hand, if i is greater than L (i>L) (step S1813: YES), the processing transitions to step S1704 depicted in FIG. 17. Thus, the first delay variation of path $P_i$ modeled as a series circuit can be corrected, with the independence of cell C(i,j) taken into consideration.

Figure 19A:
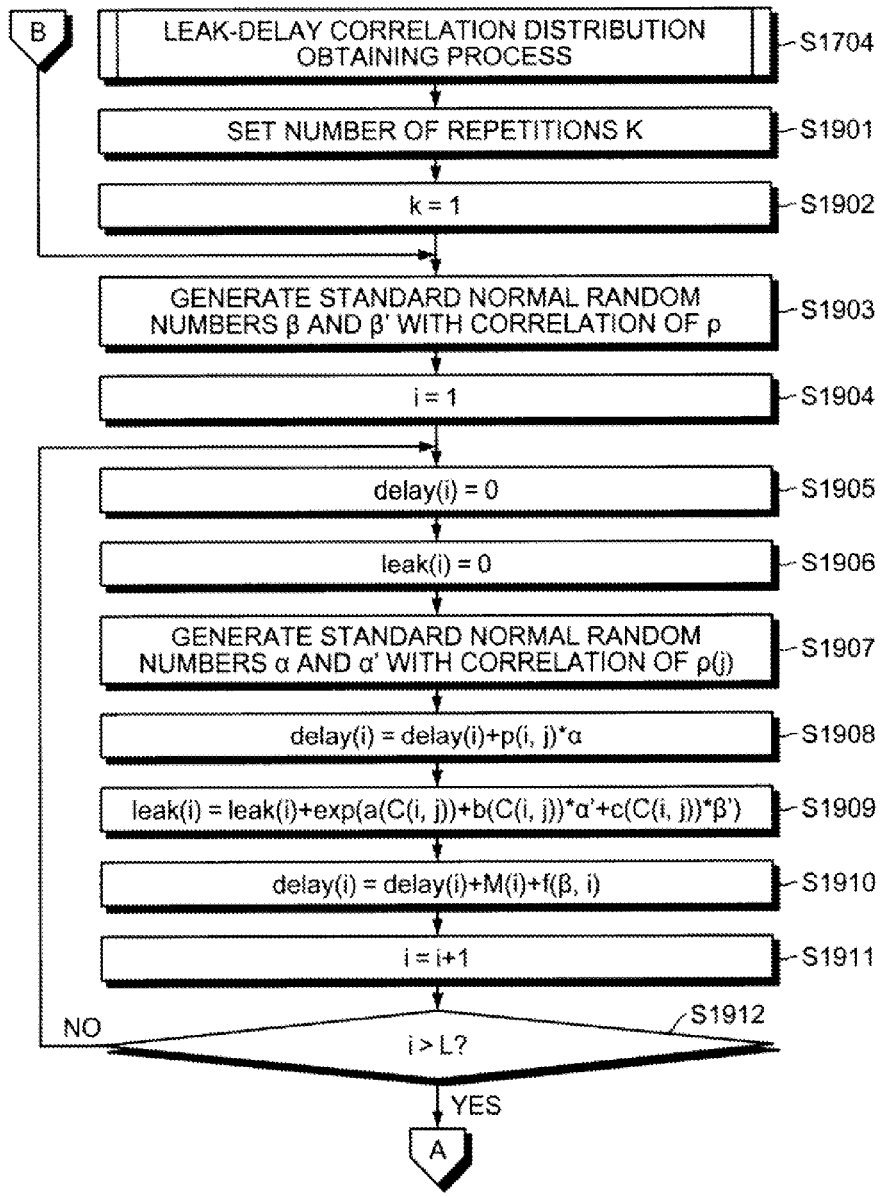

FIGS. 19A and 19B are flowcharts of exemplary procedures of the leak-delay correlation distribution obtaining process performed at step S1704 depicted in FIG. 17. Herein, a case is described in which the leak-delay correlation distribution is calculated by a simulator included in the analysis support apparatus 300.

As depicted in the flowchart of FIG. 19A, the obtaining unit 402 sets the number of repetitions K of Monte Carlo simulation (step S1901). The number of repetitions K is set in advance and stored in a storage device such as the ROM 302, the RAM 303, the magnetic disk 305, and the optical disk 307.

The simulator sets the number of repetitions K with 1 (k=1) (step S1902). The simulator generates standard normal random numbers β and β' with the correlation of ρ (step S1903), where ρ is the second variation correlation coefficient in the correlation coefficient table 700; and β and β' are parameters of the second delay variation and the second leak current variation, respectively.

The simulator sets i of path $P_i$ with 1 (i=1) (step S1904), sets a variable delay(i) concerning delay of path $P_i$ with 0 (delay(i)=0) (step S1905), and a variable leak(i) concerning leak current of path $P_i$ with 0 (leak(i)=0) (step S1906).

The simulator generates standard normal random numbers α and α' with the correlation of ρ(j) (step S1907), where ρ(j) is the first variation correlation coefficient of one of the cells C1 to CN corresponding to cell C(i,j) in the correlation coefficient table 700; and α and α' are parameters of the first delay variation and the first leak current variation, respectively.

The simulator calculates delay(i)=delay(i)+p(i,j)×α (step S1908). p(i,j) is retrieved, for example, from the corrected variation table 1000.

The simulator calculates leak(i)=leak(i)+exp(a(C(i,j))+b(C(i,j))×α'+c(C(i,j))×β') (step S1909). a(C(i,j)), b(C(i,j)), and c(C(i,j)) are retrieved, for example, from the cell leak variation table 600.

The simulator calculates delay(i)=delay(i)+M(i)+f(β,i) (step S1910). f(β,i) represents the second delay distribution of path $P_i$, where f(β)=[[$A_p$(1)]]$A_p$(i)×β when β≧0, while f(β) =[[$A_n$(1)]]$A_n$(i)×β when β<0. M(i), $A_p$, and $A_n$ are retrieved, for example, from the SSTA result table 900.

The simulator increments i (step S1911), and determines whether i is greater than L (step S1912). If i is equal to or smaller than L (i≦L) (step S1912: NO), the processing returns to step S1905. On the other hand, if i is greater than L (i>L) (step S1912: YES), the processing transitions to step S1913 depicted in FIG. 19B.

As depicted in the flowchart of FIG. 19B, the simulator calculates d(k)=max(delay(1),delay(2), . . . , delay(L)) (step S1913). The obtaining unit 402 stores the calculated d(k) into the leak-delay correlation table 1100 (step S1914).

The simulator calculates l(k)=leak(1)+leak(2)+ . . . +leak (L) (step S1915). The obtaining unit 402 stores the calculated l(k) into the leak-delay correlation table 1100 (step S1916).

The simulator increments k (step S1917), and determines whether k is greater than K (step S1918). If k is equal to or smaller than K (k≦K) (step S1918: NO), the processing returns to step S1903 depicted in FIG. 19A. On the other hand, if k is greater than K (k>K) (step S1918: YES), the processing transitions to step S1705 depicted in FIG. 17.

Thus, the leak-delay correlation distribution representing the correlation between delay and leak current of the target circuit is obtained. Further, the correlation analysis between delay and leak current becomes a Monte Carlo simulation based on equations, thereby speeding up the calculation and reducing the time consumed for the correlation analysis.

Figure 20:
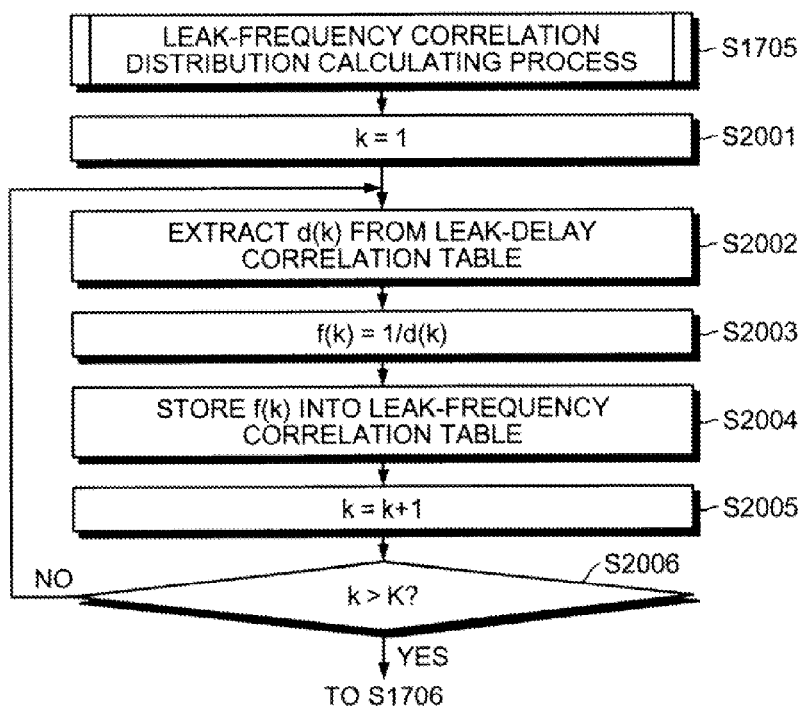
FIG. 20 is a flowchart of an exemplary procedure of a leak-frequency correlation distribution calculating process.

FIG. 20 is a flowchart of an exemplary procedure of the leak-frequency correlation distribution calculating process performed at step S1705 depicted in FIG. 17.

As depicted in the flowchart of FIG. 20, the calculating unit 403 sets k representing the correlation ID with 1 (k=1) (step S2001), and extracts d(k) from the leak-delay correlation table 1100 (step S2002). The calculating unit 403 calculates f(k)=1/d(k) (step S2003), and stores f(k) into the leak-frequency correlation table 1300 (step S2004).

The calculating unit 403 increments k (step S2005), and determines whether k is greater than K (step S2006). If k is equal to or smaller than K (k≦K) (step S2006: NO), the processing returns to step S2002. On the other hand, if k is greater than K (k>K) (step S2006: YES), the processing transitions to step S1706 depicted in FIG. 17. Thus, the leak-frequency correlation distribution representing the correlation between frequency and leak current of the target circuit can be calculated.

Figure 21:
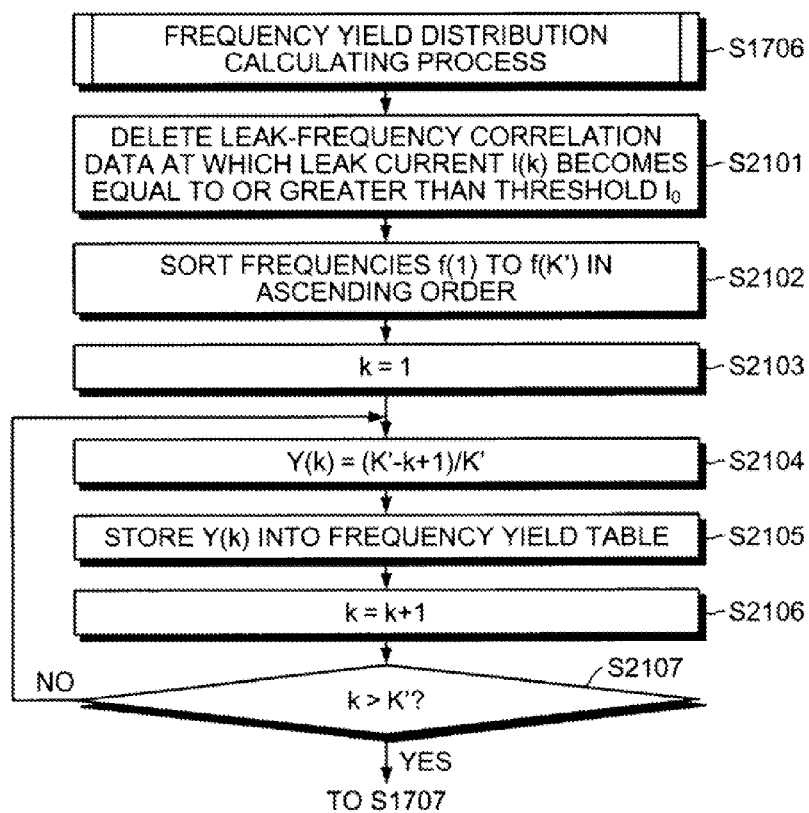
FIG. 21 is a flowchart of an exemplary procedure of a frequency yield distribution calculating process.

FIG. 21 is a flowchart of an exemplary procedure of the frequency yield distribution calculating process performed at step S1706 depicted in FIG. 17.

As depicted in the flowchart of FIG. 21, the calculating unit 403 deletes, from the leak-frequency correlation table 1300, the leak-frequency correlation data at which leak current l(k) are equal to or greater than the threshold $l_0$ (step S2101).

The calculating unit 403 refers to the leak-frequency correlation table 1300 after the deletion, and sorts frequencies f(1) to f(K') of the target circuit in ascending order (step S2102). The calculating unit 403 sets the correlation ID k with 1 (k=1) (step S2103), and calculates Y(k)=(K'−k+1)/K' (step S2104).

The calculating unit 403 stores the calculated Y(k) into the frequency yield table 1500 (step S2105). The calculating unit 403 increments k (step S2106), and determines whether k is greater than K' (step S2107).

If k is equal to or smaller than K' (k≦K') (step S2107: NO), the processing returns to step S2104. On the other hand, if k is greater than K' (k>K') (step S2107: YES), the processing transitions to step S1707 depicted in FIG. 17. Thus, the yield distribution concerning frequency of the target circuit can be calculated.

As described above, according to the embodiment, a path in the target circuit can be modeled as a series circuit, and the first delay distribution of the modeled path $P_i$ can be corrected using the first delay distribution of path $P_i$ calculated by SSTA. Thus, the time consumed for the correlation analysis between delay and leak current of the target circuit can be reduced, while achieving the accuracy of analysis.

Further, according to the embodiment, the leak-frequency correlation distribution representing the correlation between frequency and leak current of the target circuit can be calculated based on the leak-delay correlation distribution representing the correlation between delay and leak current of the target circuit. Thus, the fluctuation of delay of the target circuit due to the fluctuation of leak current caused in the target circuit can be determined.

Further, according to the embodiment, the yield distribution concerning frequency of the target circuit can be calculated based on the leak-frequency correlation distribution representing the correlation between leak current and frequency of the target circuit. Thus, the fluctuation of frequency of the target circuit due to the fluctuation of leak current caused in the target circuit can be determined.

Further, according to the embodiment, the frequency yield distribution of the target circuit can be calculated based on frequencies of the target circuit at which leak currents are below the threshold $l_0$ in the leak-frequency correlation distribution. Thus, more accurate frequency yield distribution of the target circuit can be calculated by excluding data concerning chips that do not satisfy the required specifications even if manufactured without defects.

The analysis support method described in the present embodiment may be implemented by executing a prepared program on a computer such as a personal computer and a workstation. The program is stored on a non-transitory computer-readable recording medium such as a hard disk, a flexible disk, a CD-ROM, an MO, and a DVD, read out from the recording medium, and executed by the computer.

The analysis support apparatus 300 described in the present embodiment can be realized by an application specific integrated circuit (ASIC) such as a standard cell or a structured ASIC, or a programmable logic device (PLD) such as a field-programmable gate array (FPGA). Specifically, for example, functional units (input unit 401 to output unit 406) of the analysis support apparatus 300 are defined in hardware description language (HDL), which is logically synthesized and applied to the ASIC, the PLD, etc., thereby enabling manufacture of the analysis support apparatus 300.

The embodiments effect a reduction in the time consumed for the correlation analysis between delay and leak current of a target circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein an analysis support program causing a computer to execute a procedure, the procedure comprising:
calculating, using respective standard deviations of first delay distributions of delay variation independent to each element included in each path among a plurality of parallel paths in a target circuit, standard deviation of a first delay distribution of each path when each path is modeled as a series circuit having two or more elements;
correcting, for each path, the standard deviation of the first delay distribution for each element included in the path, using the calculated standard deviation of the first delay distribution of the path and standard deviation of a first delay distribution of the path obtained by a statistical delay analysis on the target circuit;
obtaining a correlation distribution representing a correlation between delay and leak current of the target circuit by executing, using the corrected standard deviation of the first delay distribution for each element included in the target circuit, correlation analysis between a maximum delay of the plurality of parallel paths and total leak current of the target circuit; and
outputting the obtained correlation distribution.

2. The non-transitory recording medium according to claim 1, the procedure further comprising:
generating a function model representing a delay variation of the path, using the corrected standard deviation of the first delay distribution for each element included in the path and a standard deviation of a second delay distribution that is for the path and of delay variation common to all elements in the target circuit and further obtained by the statistical delay analysis on the target circuit; and
generating a function model representing a leak current variation of the path, based on a leak current variation independent to each element included in the target circuit and a leak current variation common to all elements included in the target circuit, wherein
the obtaining includes obtaining the correlation distribution by executing the correlation analysis using each generated function model and a correlation coefficient representing a correlation between the delay variation of each element included in the target circuit and the leak current variation of each element included in the target circuit.

3. The non-transitory recording medium according to claim 1, wherein
the calculating includes calculating a correlation distribution representing a correlation between leak current and frequency of the target circuit, based on the correlation distribution representing the obtained correlation between the delay and the leak current of the target circuit; and
the outputting includes outputting the calculated correlation distribution representing the correlation between the leak current and the frequency of the target circuit.

4. The non-transitory recording medium according to claim 3, wherein
the calculating includes calculating a yield distribution concerning the frequency of the target circuit, based on the correlation distribution representing the correlation between the leak current and the frequency of the target circuit; and
the outputting includes outputting the calculated yield distribution.

5. The non-transitory recording medium according to claim 4, wherein the calculating includes calculating the yield distribution, based on a frequency of the target circuit at which the leak current of the target circuit is below a given threshold in the correlation distribution representing the correlation between the leak current and the frequency of the target circuit.

6. An analysis support apparatus comprising:
a processor configured to execute a procedure, the procedure comprising:
calculating, using respective standard deviations of first delay distributions of delay variation independent to each element included in each path among a plurality of parallel paths in a target circuit, standard deviation of a first delay distribution of each path when each path is modeled as a series circuit having two or more elements;
correcting, for each path, the standard deviation of the first delay distribution for each element included in the path, using the calculated standard deviation of the first delay distribution of the path and standard deviation of a first delay distribution of the path obtained by a statistical delay analysis on the target circuit;
obtaining a correlation distribution representing a correlation between delay and leak current of the target circuit by executing, using the corrected standard deviation of the first delay distribution for each element included in the target circuit, correlation analysis between a maximum delay of the plurality of parallel paths and total leak current of the target circuit; and
outputting the obtained correlation distribution.

7. An analysis support method comprising:
calculating, by a processor and using respective standard deviations of first delay distributions of delay variation independent to each element included in each path among a plurality of parallel paths in a target circuit, standard deviation of a first delay distribution of each path when each path is modeled as a series circuit having two or more elements;
correcting, for each path, the standard deviation of the first delay distribution for each element included in the path, by the processor and using the calculated standard deviation of the first delay distribution of the path and standard deviation of a first delay distribution of the path obtained by a statistical delay analysis on the target circuit;
obtaining a correlation distribution representing a correlation between delay and leak current of the target circuit by executing, using the corrected standard deviation of the first delay distribution for each element included in the target circuit and by the processor, correlation analysis between a maximum delay of the plurality of parallel paths and total leak current of the target circuit; and
outputting the obtained correlation distribution by the processor.

* * * * *